United States Patent [19]

Mingozzi

[11] Patent Number: 4,776,148

[45] Date of Patent: Oct. 11, 1988

[54] AUTOMATIC PACKAGING MACHINE IN PARTICULAR FOR BAGS WITH AT LEAST ONE FLATTENED EDGE

[75] Inventor: Paolo Mingozzi, Faenza, Italy

[73] Assignee: Ciba Leasing S.r.l., Faenza Ra, Italy

[21] Appl. No.: 31,973

[22] Filed: Mar. 30, 1987

[30] Foreign Application Priority Data

Apr. 21, 1986 [IT] Italy .................... 3399 A/86

[51] Int. Cl.⁴ .............................................. B65B 35/56
[52] U.S. Cl. ....................................... 53/143; 53/251; 53/538; 53/544; 53/564
[58] Field of Search ............... 53/143, 564, 142, 535, 53/538, 537, 544, 244, 252, 251

[56] References Cited

U.S. PATENT DOCUMENTS

| | | | |
|---|---|---|---|
| 3,456,423 | 7/1969 | Helms | 53/143 |
| 3,802,154 | 4/1974 | Dillon | 53/143 X |
| 3,878,665 | 4/1975 | Couten | 53/143 |
| 4,192,415 | 3/1980 | Krener et al. | 53/143 X |

Primary Examiner—James F. Coan
Attorney, Agent, or Firm—Guido Modiano; Albert Josif

[57] ABSTRACT

Automatic packaging machine, in particular for bags with at least one flattened edge, comprising a frame which downwardly supports a lateral magazine of flattened boxes, an assembly for folding individual boxes to a parallelpipedal shape and an assembly for closing the bottom and transferring boxes into a filling area. The frame upwardly supports a bag feed line ending at the inlets of two co-planar, parallel and lateral transport lines for arranging side to side the bags. The transfer lines end at the machine filling area, where an assembly is provided for transferring groups of bags in the underlying box with the bottoms thereof substantially resting against the counterposed side walls of the box.

4 Claims, 3 Drawing Sheets

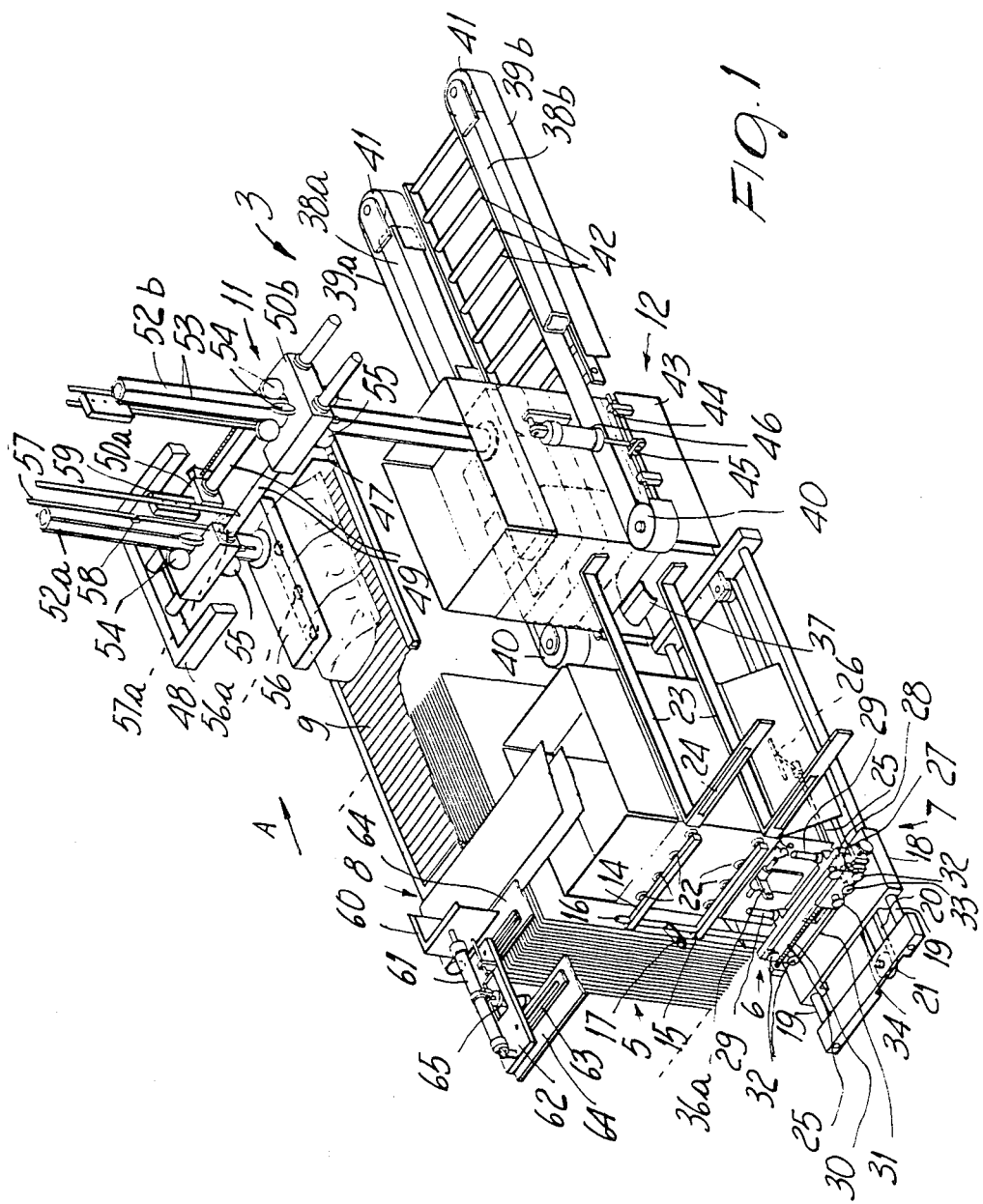

4,776,148

AUTOMATIC PACKAGING MACHINE IN PARTICULAR FOR BAGS WITH AT LEAST ONE FLATTENED EDGE

BACKGROUND OF THE INVENTION

The present invention relates to an automatic packaging machine, in particular for bags with at least one flattened edge.

In the distribution of products, there is a widespread use of bags or sacs in flexible material which are partially filled with products and which have one or more counterposed flattened edges.

These bags are arranged in parallelepipedal boxes, usually made of cardboard, with the regions filled with products stacked one on the other, and with the flattened regions also stacked one on the other.

The width of the boxes is usually slightly greater than the height of the regions of the bags filled with products, and therefore the flattened regions of the bags are badly folded and sometimes damaged during packaging: on the other hand, an increase in the width of the boxes would lead to an increase in the cost of the same boxes and of their storage and transport, and the bags would not be properly held in place in the boxes during transport.

The above facts lead to significant disadvantages, also due to the fact that the automatic packaging machines currently in use are not capable of effectively and quickly operating with such types of bags.

SUMMARY OF THE INVENTION

The aim of the present invention is to provide a machine for the optimum packaging of bags with one or two flattened edges, which avoids damage to the bags and does not lead to an increase in the dimensions of the boxes.

This aim is achieved by the present packaging automatic machine, in particular for bags with one or two counterposed flattened edges, as described in the appended claims.

BRIEF DESCRIPTION OF THE DRAWINGS

The features of the invention will become apparent and evident from the detailed description of a preferred, but not exclusive, embodiment of a machine according to the invention, illustrated only by way of non-limitative example in the accompanying drawing, wherein:

FIG. 1 is a schematic cutout perspective view of a machine according to the invention;

DESCRIPTION OF THE PREFERRED EMBODIMENTS

Figure 2A:
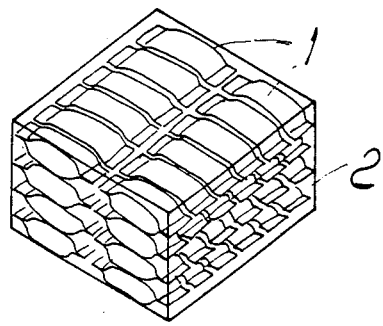
FIGS. 2a-2c show perspective views of three filling solutions which can be performed with the machine according to the invention.

With reference to the above described figures, a bag is generally indicated at 1, the reference numeral 2 indicates a box in which the bags are to be inserted and 3 indicates an automatic machine for inserting the bags in the box.

The machine 3 comprises a supporting frame 4, a magazine 5 for the flattened boxes, an assembly 6 for forming tubular boxes, an assembly 7 for closing the bottom of the boxes and for transferring it into a filling area, a bag feed line 8, two roller lines 9 and 10 for arranging the bags side by side (see FIGS. 3 and 4), an assembly 11 for the transfer of rows of bags into a box and means 12 for closing and supporting the bag during filled.

The magazine 5 is arranged to one side in the lower part of the machine 3 and contains the flattened boxes sideby-side with a larger face towards the machine and the opening edges or flaps arranged above and below.

The box forming assembly 6 comprises two arms 14 and 15 which are rotatably carried by a vertical shaft 16 which is rotatably operated alternately through 90° by means of a small arm 17 associated to a fluidodynamic jack; the shaft 16 is mounted on a slider 18 which is slideable along longitudinal guides 19: the slider 18 is operated by a chain 20 toothed wheel 21 element which derives its motion from a motor reducer assembly fixed to the frame 4.

A plurality of suction cups 22 are fixed to the arms 14 and 15 and are connected to an aspirator not illustrated in the figure.

Two longitudinally elongated abutments 23 are fixed to the frame 4, and their distance from the magazine 5 can be adjusted by means of eyelets 24: the abutments 23 are positioned so that their distance from the first box in the magazine is substantially equal to the width of the box to be formed: the operation of the shaft 16 makes the arms 14 and 15, with their suction cups, rest against the face of the first box and then rotate through 90°, while the side of the box is blocked by the abutments 23: the box folds therefore like a parallelepiped following the prepunched folding lines. It should be noted that, for different box sizes, the face of the box looking to the magazine and the box face engaged by the suction cups remain fixed, while the position of the two faces, opposed to the former ones, may vary according to the size of the box.

Two longitudinal shafts 25 are mounted on the slider 18 and support respective spatulas 26 suitable for determining a slight outward folding of the lower lateral flaps of the boxes so as to allow the correct inward folding of the front and rear flaps: one of the shafts 25, the one towards the magazine 5, is rotatably mounted on a support 28 but cannot slide thereon while the other one is rotatably mounted on a small frame 27 which is slideably guided transversely to the support 28 which in turn can be vertically shifted, according to the size of the box, along two small columns 29 projecting upwardly from the slider 18.

The transverse sliding of the small frame 27 with respect to the support 28 is achieved by means of an endless screw 30 freely coupled with respect to the support and threaded into a nut rigidly coupled to the small frame.

The opposite rotation of the shafts 25 is achieved by means of a toothed belt or chain 31 which is wound on four small toothed pulleys, or wheels, 32 freely mounted substantially proximate to the corners of the support 28; the small shaft 25 proximate to the magazine is keyed onto one of the small pulleys 32 while the other shaft is keyed to a matching pulley 33 on which the back of the belt winds by virtue of the small pulley 34 which is freely mounted on the small frame 27: the rotation of one of the shafts 25 in one direction results in a rotation in the opposite direction of the outer shaft and the connection described above allows to adjust the interspace between the shafts by previously unblocking and subsequently reblocking a pulley with respect to the small shaft.

The forward folding of the rear flap towards the center of the box is achieved by means of a spatula 35 freely mounted on a transverse small shaft 36 operated by a lever arm 36a by means of a jack not illustrated in the figure: the elevation of the small shaft 36 will also be adjustable according to the size of the box.

The backward folding of the front flap towards the center of the box is instead achieved by means of a fixed cam profile 37, adjustable in elevation, against which the box collides during its forward motion due to the advancement of the slider 18.

At the ends of the guides 19, a counterframe is fixed on the frame 4, and is composed of side members 38a, 38b which support two lateral belts 39a, 39b closed on themselves in a loop and wound on respective pulleys 40, 41 under the belts.

In the first part of the counterframe, in a box filling area, an assembly is provided for closing the side flaps, composed of respective spatulas or wings 43 mounted on respective longitudinal lateral shafts 44 rotatably mounted on the respective side members 38 and rotated by radial lever arms 45 - fluidodynamic jacks 46; in the middle region a sort of a knife-edge is downwardly arranged on a vertical plane for keeping the front and rear flaps folded towards the center of the box before folding the lateral flaps.

In the second part of the counterframe, a platform having free transverse rollers 42 is provided for supporting the box, closed on the bottom and filled.

At the end of the belts 39a, 39b the operation of which is suitable to bring about the advancement of the box, arrangements are made for eventual closing and gluing assemblies for the upper flaps.

According to the size of the box, it is possible to adjust the elevations of the lateral belts 39a, 39b the transverse distance of the side member 38b from the side member 38a (the latter always staying on the same vertical plane), the relative height of the shafts 44, the elevation of the cam profile 37, the elevation of the roller platform 42.

The two roller lines 9 and 10 for arranging the bags side by side, of a known type, are mounted on the frame 4, and are composed of a plurality of sections of motorized frictioned rollers which are suitable for the transfer of the bags in direction A up to a fixed abutment 47 and to ensure that the bags arrange themselves side to side as required without overlapping and damaging.

At the box filling area above the frame 4, assembly 11 comprise a transverse counterframe 48, on which two transverse guides 49 are mounted; along the guides 49, two skids 50a, 50b are slideably mounted, the relative distance of which is adjustable by virtue of an endless screw 51 freely rotatably mounted with respect to the skid 50a and threaded in a nut rigidly coupled to 50b; the skids are operated on one side or on the other along the guides 49 by associating one thereof either to a transverse fluidodynamic jack or to a chain or belt system, closed on itself in a loop and wound on pairs of toothed wheels or driving and idle pulleys with their axes fixed to the counterframe (the transverse operating means for the skids have not been illustrated for clarity sake).

In respective openings with vertical axes of the skids 50a, 50b respective columns 52a, 52b are vertically movable, each being provided with four projecting ridges 53 which are guided in four grooved upper rollers 54 and lower rollers 55 freely mounted with horizontal axes on the skids 50a, 50b at the base of the columns 52a, 52b shoes 56 are fixed which, on their lower part, have surfaces with aspirating suction cups, schematically indicated at 56a, for gripping the bags.

Raising and lowering of the columns 52a, 52b is achieved by means of respective belts 57 fixedly secured at 58 to the columns: the belts 57 have a closed loop-like shape and are wound on pairs of small pulleys 57a with horizontal axes which are mounted on the counterframe and of which one is a driving pulley and is associated to a motor-reducer assembly, and one is an idle pulley: the pairs of small pulleys 57a are arranged with their centers on the same vertical line so that the active stringer of the belts 57 is parallel to the column; on the return stringers of each of the belts 57, a respective counterweight 59 is fixed for compensating the weight of the column-shoe-bags in order to use smaller and faster belt operating motors.

The machine according to the invention alternately takes the bags arranged side to side on the roller lines 9 and 10 by means of the shoes 56, and while one shoe takes from one line a group of bags, the other shoe descends into the box to deposit the group of bags previously taken from the other line; the shoes 56, in other words, are suitable for moving from a high position, during lateral motions, to a lower takeup position (on the lines 9 and 10) to a low depositing position (on the box in the filling area). Below the shoes 56, respective sensors for the bags are arranged for halting descent of the columns, and therefore of the shoes, upon detection of either the bags present on line 9 or 10, or the bottom of the box or even the bags previously deposited in the box.

Figure 3:
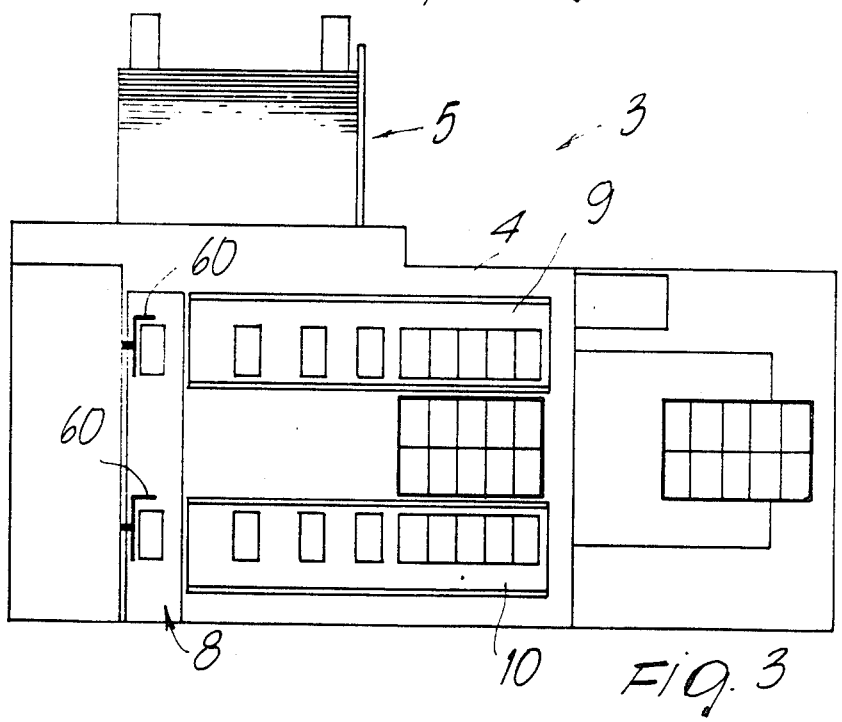
FIG. 3 is a schematic top plan view of the inventive machine with a first type of feed.
Figure 4:
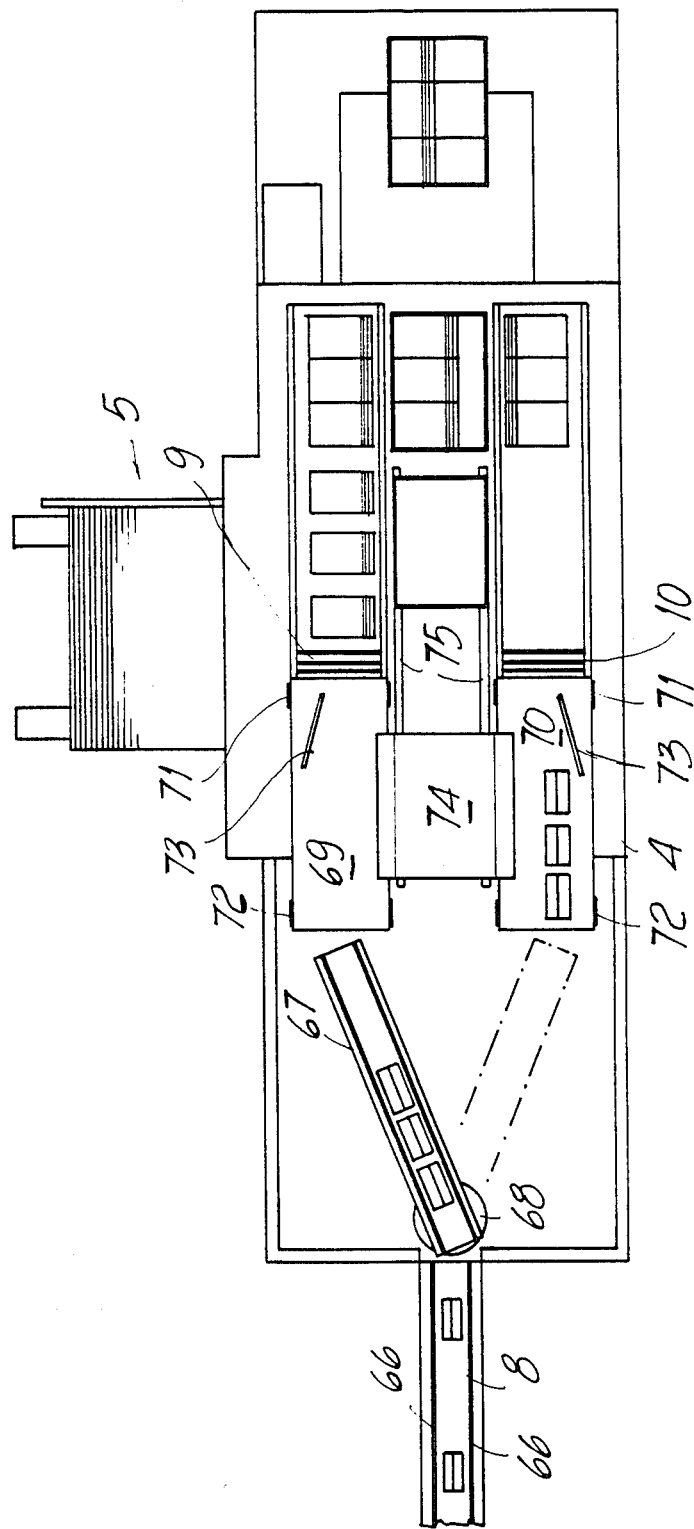
FIG. 4 is a plan view of a machine according to the invention with a second type of feed.

The bag feed line 8 is of the conveyor-belt type and can be of the type illustrated in FIGS. 1 and 3 or in FIG. 4: in the first case, the line 8 is perpendicular to the lines 9 and 10, while in the other it is parallel thereto.

In the machine of FIGS. 1 and 3, at the height of the inlets of the lines 9 and 10 above the feed line 8 two halting and moving small squares 60 are arranged: the squares 60 are carried at the ends of the rods of fluidodynamic jacks 61 the bodies of which are articulated to respective small plates 62 along horizontal axes extending parallel to the feed line 8; the small plates 62 are in turn slideable and adjustably lockable with related bolts-nuts along two slots 63 provided in an extended portion 64 of the upper machine workbench; each of the small plates 62 further carries the body of a second vertical axis fluidodynamic jack 65 the rod whereof is associated to the body of the jack 61; the jack 61 is suitable for transferring a bag halted by a square from the feed line 8 to the roller line 9 or 10 while the jack 65 is suitable for determining lifting of the square 60 firstly met by the bag to allow the bag to continue advancing on the feed line 8 up to the next square 60.

If the bags to be packaged are of the type illustrated schematically in FIG. 1 with only one flattened portion of the upper edge, they fed to the line 8 layed out with the bottoms alternatively forwards or backwards and according to this arrangement the square 60b will be raised or not as they pass.

Instead, when the feed line 8 is orientated parallel to the roller lines 9 and 10 (FIG. 4), on the same the bags are fed in an upright position, supported on the sides by guides 66: at the outlet of feed line 8, a closed loop conveyor belt 67 extends, which is also provided with guides for keeping the bags upright; the belt 67 is flagwise articulated proximate to its inlet so that it can swing (i.e. it is protrudingly supported by a rotatable base 68) to extend toward the roller line 9 or roller line 10: to have the bags lay down between the outlet of belt 67 and the inlets of roller lines 9 and 10 two closed loop conveyor belts 69, 70 are provided, wound on respective driver 71 and idle 72 rollers above which fixed cams 73 are arranged for making the bags drop with their flattened mouths facing towards the middle plane of the machine.

Above and at the midpoint of the machine an interlayer magazine 74 with related slides 75 has been provided.

It should be noted that in FIGS. 3 and 4 the machine has been illustrated in a very schematic manner without the assembly 11.

Figure 2B:
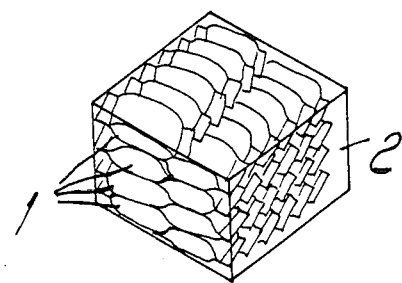
Figure 2C:
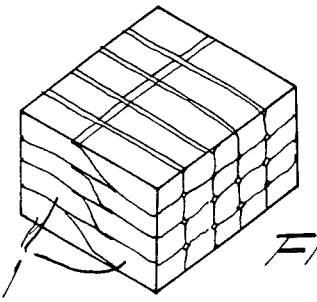

With the machine according to the invention it is possible to fill boxes with various types of bags, e.g. those illustrated in FIGS. 2a-2c: for packaging of bags as shown in FIG. 2b between the end rollers of the lines 9 and 10 sort of knives may be provided which are lifted to raise the foremost edges of each bag to have it overlap the rear edge of the preceding bag.

Attention is drawn to the extreme speed of the machine, wherein during filling of one box the next one is formed and the preceding one is closed and moved away.

It has been thus seen that the invention achieves the intended aim.

The invention thus conceived is susceptible to numerous modifications and variations, all of which are within the scope of the inventive concept.

Moreover, all the details may be replaced with technically equivalent elements.

In practice, the materials employed, as well as the dimensions and the contingent shapes, may be any according to the requirements, within the scope of the protection of the following claims.

1. Automatic packaging machine, in particular for bags with at least one flattened end, comprising a support frame, a magazine supported by said frame and containing side-by-side and vertically arranged flattened boxes, a box forming assembly for forming tridimensional boxes having opened upper and bottom portions, an assembly for for closing said bottom portions and transporting said boxes to a filling area, means for filling said boxes with bags arranged at said filling area, a feed line for the bags, two co-planar and parallel transport lines, arranged downstream of said feed line and receiving the bags therefrom, said transport lines having means for forming groups of adjacent bags, said closing and transporting assembly comprising a horinzontally movable slider, means for moving said slider between a position facing said magazine and said filling area, a vertical shaft mounted for rotation on said slider, a pair of arms horizontally fixed on said vertical shaft, suction cups fixed to said arms and connectable to suction means, means for rotating said shaft alternatively between a box take-up position in which said suction cups rest against a first of said flattened boxes in said magazine and a further position rotated through 90° with respect to said box take-up position for opening said flattened box to a parallelepipedal shape.

2. Automatic packaging machine according to claim 1, wherein said box forming assembly comprises fixed cam profiles and articulated arms for folding front and rear flaps of the bottom portion of the boxes and then lateral flaps.

3. Automatic packaging machine according to claim 1, wherein said feed line extends at right angle to said transport lines and comprises two square elements movable transversely with respect to said feed line for pushing individual bags on said transport lines, at least one of said square elements being raisable from said feed line to allow the bags to continue travel on said feed line.

4. Automatic packaging machine according to claim 1 comprising a conveyor belt extending from said feed line and flag-wise articulated at the outlet thereof along a vertical axis, said belt swinging for alternatively and selectively connecting said feed line to one of said transport lines

* * * * *